(12) United States Patent
Jayanth et al.

(10) Patent No.: US 8,604,737 B2
(45) Date of Patent: Dec. 10, 2013

(54) SYSTEMS AND METHODS FOR PROTECTING THREE-PHASE MOTORS

(71) Applicant: Emerson Climate Technologies, Inc., Sidney, OH (US)

(72) Inventors: Nagaraj B. Jayanth, Pune (IN); Wayne R. Warner, Piqua, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 0 days.

(21) Appl. No.: 13/738,191

(22) Filed: Jan. 10, 2013

(65) Prior Publication Data

US 2013/0120881 A1 May 16, 2013

Related U.S. Application Data

(63) Continuation of application No. 13/242,725, filed on Sep. 23, 2011, now Pat. No. 8,390,221.

(60) Provisional application No. 61/386,779, filed on Sep. 27, 2010.

(51) Int. Cl.
*H02H 7/08* (2006.01)
*G05D 23/22* (2006.01)
*G05D 23/02* (2006.01)

(52) U.S. Cl.
USPC .......... 318/471; 318/376; 318/434; 318/473; 361/103; 361/106; 323/274; 337/16; 337/27; 337/85

(58) Field of Classification Search
USPC ........ 318/432, 434, 376, 471; 361/22, 23, 24, 361/26, 103, 105, 106; 323/274; 337/16, 337/27, 85
See application file for complete search history.

(56) References Cited

U.S. PATENT DOCUMENTS

| | | | | |
|---|---|---|---|---|
| 3,903,456 A | * | 9/1975 | Schaefer | 361/24 |
| 4,057,842 A | | 11/1977 | Bauman et al. | |
| 4,084,406 A | * | 4/1978 | Brenneman | 62/211 |
| 4,574,229 A | | 3/1986 | Kim | |
| 5,057,962 A | | 10/1991 | Alley et al. | |

(Continued)

FOREIGN PATENT DOCUMENTS

| | | |
|---|---|---|
| JP | 2001-289493 A | 10/2001 |
| JP | 2009112105 A | 5/2009 |

OTHER PUBLICATIONS

International Search Report regarding Application No. PCT/US2011/053352, dated Apr. 10, 2012.

(Continued)

*Primary Examiner* — Rita Leykin
(74) *Attorney, Agent, or Firm* — Harness, Dickey & Pierce, P.L.C.

(57) ABSTRACT

A three-phase electric motor of a compressor receives first, second, and third phases from a three-phase power supply. A method for protecting the motor includes, using a line break protector, disconnecting the motor from only the first phase in response to a temperature being greater than a predetermined temperature threshold. The method also includes measuring a first current flowing through the line break protector, and determining a current value based on the first current independent of current in the second and third phases. The method further includes disconnecting the motor from the first, second, and third phases in response to the current value being less than or equal to a predetermined threshold.

20 Claims, 6 Drawing Sheets

(56) References Cited

U.S. PATENT DOCUMENTS 5,784,232 A * 7/1998 Farr .................................. 361/22
6,005,471 A * 12/1999 Higashikata et al. ......... 337/347
6,049,143 A    4/2000 Simpson et al.
6,540,484 B1 * 4/2003 Hugenroth et al. ............. 417/32
6,778,372 B2   8/2004 Elhabr 2004/0021994 A1   2/2004 Herrick
2009/0167229 A1   7/2009 Brunner et al.

OTHER PUBLICATIONS

Written Opinion of the International Searching Authority regarding Application No. PCT/US2011/053352, dated Apr. 10, 2012.

* cited by examiner

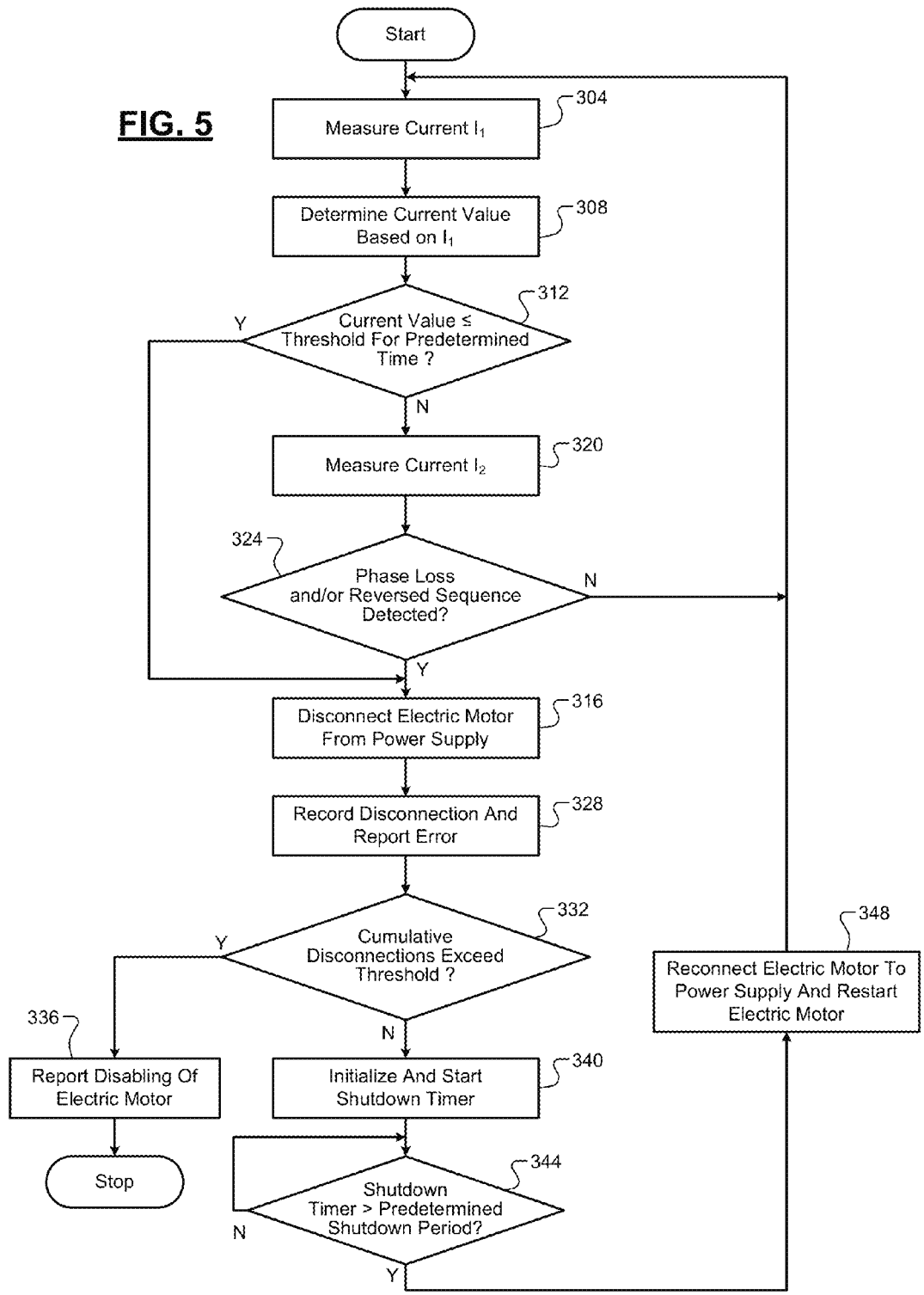

SYSTEMS AND METHODS FOR PROTECTING THREE-PHASE MOTORS

CROSS-REFERENCE TO RELATED APPLICATIONS

This application is a continuation of U.S. patent application Ser. No. 13/242,725, filed Sep. 23, 2011, now U.S. Pat. No. 8,390,221, which claims the benefit of U.S. Provisional Application No. 61/386,779, filed Sep. 27, 2010. The entire disclosures of the above referenced applications are incorporated herein by reference.

FIELD

The present disclosure relates to electric motors and more particularly to systems and methods for protecting three-phase electric motors using a single-phase line break protector.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Distributing electric power in three phases is a common method of electric power transmission. A three-phase power system uses three alternating current (AC) voltage sources whose phases are each separated by 120 degrees. In a balanced three-phase power system, three power supply lines carry three AC signals of the same frequency (and therefore the same period), which reach their instantaneous peak values at different times. Taking a current carried by one of the three power supply lines as a reference, the other two currents are delayed in time by one-third and two-thirds, respectively, of one period of the electrical current.

One common way to produce the three AC voltage sources is to construct an AC generator/alternator in which a rotating magnetic field passes by three sets of wire windings, each set spaced 120 degrees apart around the circumference of the generator/alternator. A phase voltage refers to the amount of voltage measured across any one AC voltage source, such as one wire winding set in an AC generator/alternator. Three-phase power may be used to power motors and many other devices. For example, three-phase power may be used to power hermetic compressor motors such as motors in reciprocating compressors.

The windings of a motor can be connected to three-phase power supply lines in different configurations, including those shown in FIGS. 1A and 1B. More specifically, FIG. 1A depicts a "Δ" (delta) configuration, while FIG. 1B depicts a "Y" configuration, also known as a star configuration. In the delta configuration, the windings are connected between the three power supply lines. In the star configuration, the windings are connected from each of the three power supply lines to a common node. The common node may be connected to a neutral line (N), which is present in some applications of the star configuration. The neutral line N may allow lower voltage devices to be connected between one of the power supply lines and the neutral line, which provides a lower voltage than when connecting between two of the power supply lines.

SUMMARY

A system for protecting a three-phase electric motor of a compressor, the motor receiving first, second, and third phases from a three-phase power supply, the system including a single-phase line break protector, a first current sensor, and a control module. The single-phase line break protector disconnects the motor from the first phase in response to a temperature being greater than a predetermined temperature threshold. The first current sensor measures a current through the single-phase line break protector. The control module determines a current value based on the measured current, and disconnects the motor from the second and third phases in response to the current value being less than or equal to a predetermined threshold.

In other features, the predetermined threshold is zero. In other features, the control module disconnects the motor from the first, second, and third phases in response to the current value being less than or equal to the predetermined threshold. In other features, the current value includes one of a peak of the measured current during a predetermined period and a root mean squared (RMS) of the measured current during the predetermined period.

In other features, the control module reconnects the motor to the second and third phases a predetermined shutdown period after disconnecting the second and third phases. In other features, the system includes a second current sensor that measures a current corresponding to one of the second and third phases, and the control module selectively detects at least one of a phase loss and reversed phase sequence based on the measured currents and disconnects the motor from the second and third phases in response to one or more of the phase loss and the reversed phase sequence being detected. In other features, the control module, in response to occurrences of disconnecting the motor from the second and third phases, transmits a report to a remote device via a network.

In other features, the single-phase line break protector includes first and second elements that selectively conduct the current, wherein the first and second elements bend based on the temperature, and wherein the temperature is based on a magnitude of the current. In other features, at least one of the first and second elements is a bimetallic element. In other features, the single-phase line break protector further includes first and second contacts that are electrically connected to the first and second elements, respectively, wherein the first and second contacts separate when the first and second elements bend thereby disconnecting the motor from the first phase. In other features, the single-phase line break protector is located proximate to a winding of the motor, and wherein the temperature is based on heat generated by the winding during operation of the motor.

A method for protecting a three-phase electric motor of a compressor, the motor receiving first, second, and third phases from a three-phase power supply, the method including disconnecting the motor from the first phase using a single-phase line break protector in response to a temperature being greater than a predetermined temperature threshold, measuring a current through the single-phase line break protector, determining a current value based on the measured current, and disconnecting the motor from the second and third phases in response to the current value being less than or equal to a predetermined threshold.

In other features, the predetermined threshold is zero. In other features, the method includes disconnecting the motor from the first, second, and third phases in response to the current value being less than or equal to the predetermined threshold. In other features, the current value includes one of a peak of the measured current during a predetermined period and a root mean squared (RMS) of the measured current during the predetermined period. In other features, the method includes reconnecting the motor to the second and third phases a predetermined shutdown period after disconnecting the second and third phases.

In other features, the method includes measuring a current corresponding to one of the second and third phases, selectively detecting at least one of a phase loss and reversed phase sequence based on the measured currents, and disconnecting the motor from the second and third phases in response to one or more of the phase loss and the reversed phase sequence being detected. In other features, the single-phase line break protector includes first and second elements that selectively conduct the current, wherein the first and second elements bend based on the temperature, and wherein the temperature is based on a magnitude of the current. In other features, at least one of the first and second elements is a bimetallic element.

In other features, the single-phase line break protector further includes first and second contacts that are electrically connected to the first and second elements, respectively, wherein the first and second contacts separate when the first and second elements bend thereby disconnecting the motor from the first phase. In other features, the single-phase line break protector is located proximate to a winding of the motor, and wherein the temperature is based on heat generated by the winding during operation of the motor. In further features, the method includes, in response to occurrences of the disconnecting, transmitting a report to a remote device via a network.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5 is a flow diagram of a method for protecting a three-phase electric motor using a single-phase line break protector according to one implementation of the present disclosure.

DETAILED DESCRIPTION

Figure 1A:
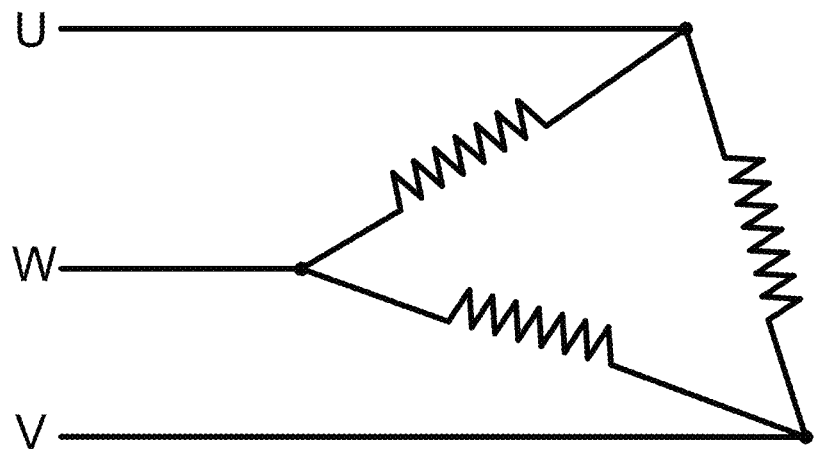
FIGS. 1A and 1B are schematics of motor winding connections according to the prior art.
Figure 1B:
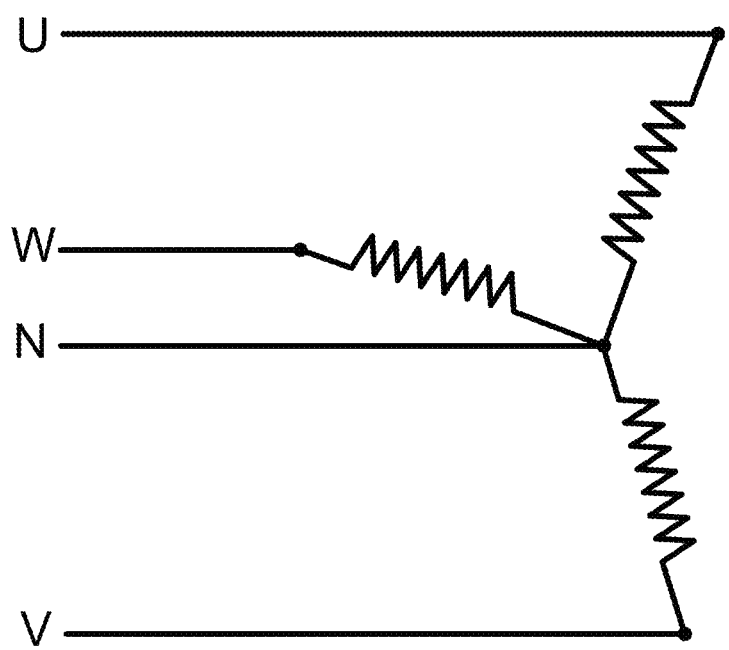

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

As previously described, three-phase power includes three alternating currents having equal magnitudes and frequencies but different phases. The alternating currents may generate a magnetic field that rotates in a specified direction. The directional magnetic field provides for improved designs and/or control of three-phase electric motors. Specifically, three-phase electric motors may achieve higher torques and/or efficiencies compared to other electric motors such as single-phase and two-phase electric motors. For example, three-phase electric motors may be implemented in compressors, such as in refrigeration systems.

Figure 2A:
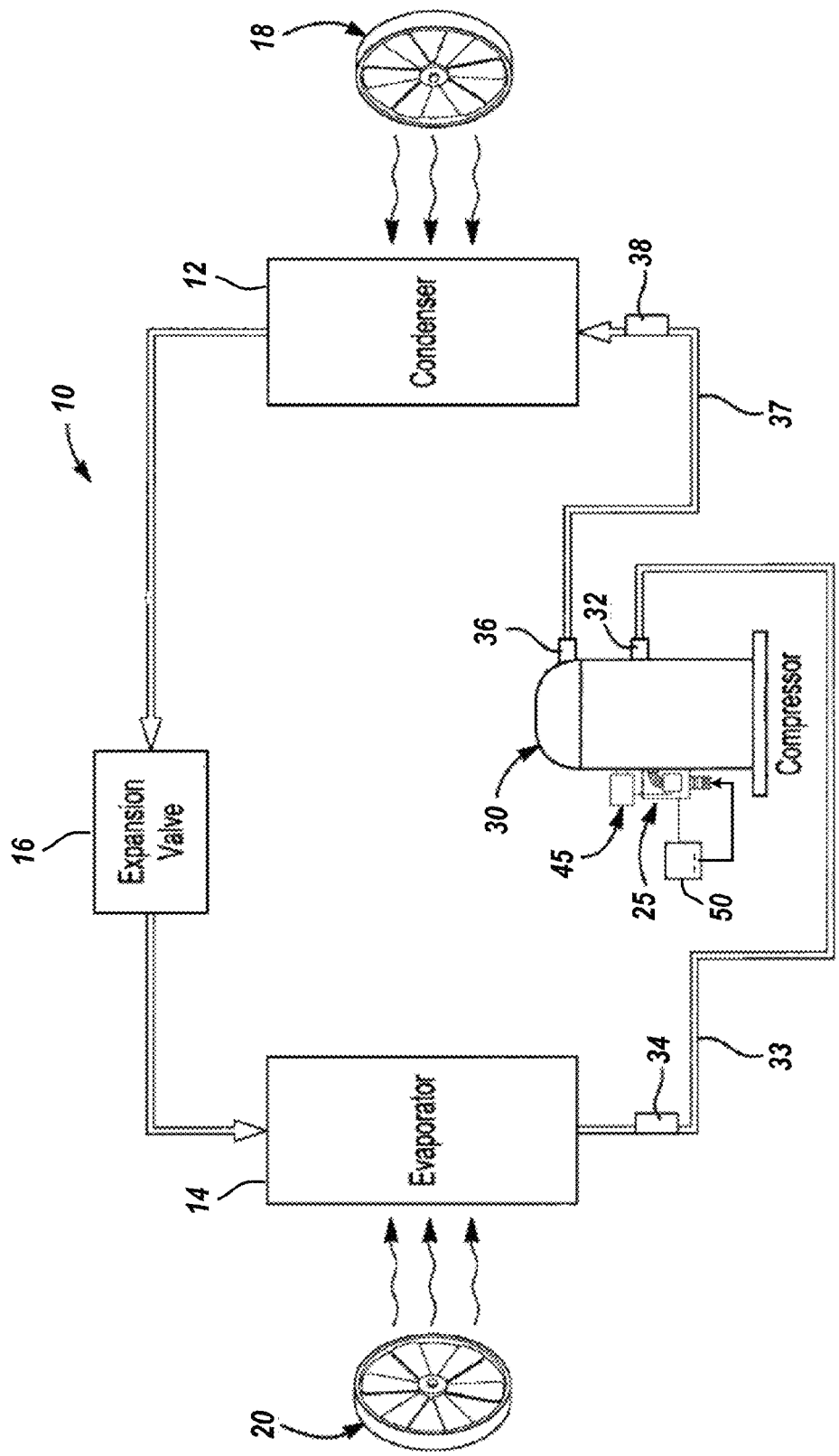
FIG. 2A is a schematic of a refrigeration system that includes a compressor having a three-phase electric motor according to one implementation of the present disclosure.

Referring now to FIG. 2A, a refrigeration system 10 is shown as including a condenser 12, an evaporator 14, and an expansion device 16 between the condenser 12 and the evaporator 14. The refrigeration system 10 also includes a condenser fan 18 associated with the condenser 12 and an evaporator fan 20 associated with the evaporator 14. Each of the condenser fan 18 and the evaporator fan 20 may be variable-speed fans that can be controlled based on a cooling and/or heating demand of the refrigeration system 10. Furthermore, each of the condenser fan 18 and the evaporator fan 20 may be controlled by a control system 25 such that operation of the condenser fan 18 and evaporator fan 20 may be coordinated with operation of a compressor 30.

In operation, the compressor 30 circulates refrigerant generally between the condenser 12 and evaporator 14 to produce a desired heating and/or cooling effect. The compressor 30 receives vapor refrigerant at an inlet fitting 32 from the evaporator 14 via inlet line 33. Inlet line 33 may include a protective switch 34 such as a low pressure cut-out switch. For example only, the compressor 30 may be a scroll compressor or a hermetic reciprocating compressor. For example, the scroll compressor may compress the vapor refrigerant between an orbiting scroll member and a non-orbiting scroll member. The control system 25 may regulate operation of the compressor 30 via an actuation assembly 45 and a power supply 50.

Once the compressor 30 has sufficiently compressed the vapor refrigerant to discharge pressure, the discharge-pressure refrigerant exits the compressor 30 at the discharge fitting 36 and travels to the condenser 12 via discharge line 37. Discharge line 37 may include a protective switch 38 such as a high-pressure cut-out switch. Once the vapor enters the condenser 12, the refrigerant changes phase from a vapor to a liquid, thereby rejecting heat. The rejected heat is removed from the condenser 12 through circulation of air through the condenser 12 by the condenser fan 18. When the refrigerant has sufficiently changed phase from a vapor to a liquid, the refrigerant exits the condenser 12 and travels within the refrigeration system 10 generally towards the expansion device 16 and evaporator 14.

Upon exiting the condenser 12, the refrigerant first encounters the expansion device 16. Once the expansion device 16 has sufficiently expanded the liquid refrigerant, the liquid refrigerant enters the evaporator 14 to change phase from a liquid to a vapor. Once disposed within the evaporator 14, the liquid refrigerant absorbs heat, thereby changing from a liquid to a vapor and producing a cooling effect. If the evaporator 14 is disposed within an interior of a building, the desired cooling effect is circulated into the building to cool the building by the evaporator fan 20. If the evaporator 14 is associated with a heat-pump refrigeration system, the evaporator 14 may be located remotely from the building. In either configuration, once the refrigerant has sufficiently changed phase from a liquid to a vapor, the vaporized refrigerant is received by the inlet fitting 32 of the compressor 30 to begin the cycle anew.

Figure 2B:
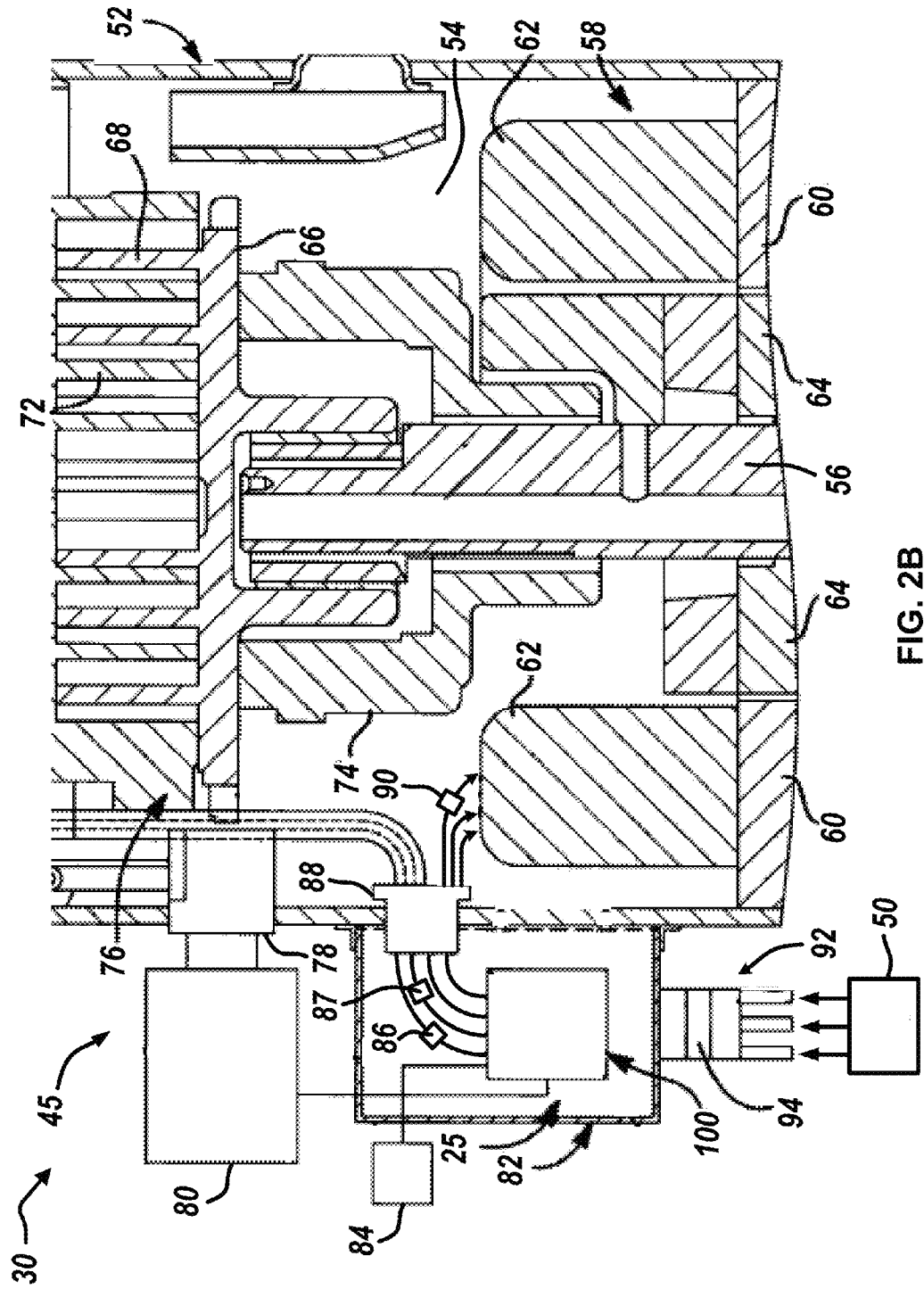
FIG. 2B is a cross-sectional view of a compressor according to one implementation of the present disclosure.

Referring now to FIG. 2B, a cross-sectional view of a portion of the compressor 30 and the control system 25 are shown in more detail. The compressor 30 is shown to include a generally cylindrical hermetic shell 52 having a welded cap (not shown) at a top portion and a base (not shown) defining an interior volume 54 of the compressor 30. While the compressor 30 shown is a scroll compressor, the compressor 30 may also be a different type of compressor, such as a hermetic reciprocating compressor.

A crankshaft 56 is rotatably driven by an electric motor 58 relative to the shell 52. For example, the electric motor 58 may include a three-phase motor having three windings 62. Specifically, the motor 58 includes a stator 60 fixedly supported by the shell 52, windings 62 passing therethrough, and a rotor 64 press-fit on the crankshaft 56. The stator 60, the windings 62, and the rotor 64 cooperate to drive the crankshaft 56 relative to the shell 52 to compress a fluid.

The compressor 30 may further include an orbiting scroll member 66 having a spiral vane or wrap 68 on an upper surface thereof for use in receiving and compressing a fluid. An Oldham coupling (not shown) is disposed generally between the orbiting scroll member 66 and bearing housing 74 and is keyed to the orbiting scroll member 66 and a non-orbiting scroll member 76. The Oldham coupling transmits rotational forces from the crankshaft 56 to the orbiting scroll member 66 to compress a fluid disposed generally between the orbiting scroll member 66 and the non-orbiting scroll member 76. Non-orbiting scroll member 76 also includes a wrap 72 positioned in meshing engagement with the wrap 68 of the orbiting scroll member 66.

An electrical enclosure 82 may be positioned on the shell 52 of the compressor 30 and may be used to house respective components of the control system 25 and/or other hardware used to control operation of the compressor 30 and/or refrigeration system 10. For example, the electrical enclosure 82 may include a control module 100 that controls operation of the compressor 30. The actuation assembly 45 selectively modulates a capacity of the compressor 30. The actuation assembly 45 may include a solenoid 78 connected to the orbiting scroll member 66 and a controller 80 coupled to the solenoid 78 for controlling movement of the solenoid 78 between an extended position and a retracted position.

Movement of the solenoid 78 into the extended position rotates a ring valve (not shown) surrounding the non-orbiting scroll member 76 to bypass suction gas through at least one passage (not shown) formed in the non-orbiting scroll member 76 to reduce an output of the compressor 30. Conversely, movement of the solenoid 78 into the retracted position moves the ring valve to close the passage to increase a capacity of the compressor 30 and allow the compressor 30 to operate at full capacity. In this manner, the capacity of the compressor 30 may be modulated in accordance with demand or in response to a fault condition.

A hermetic terminal assembly 88 may be used with switches, valves, and/or sensors to maintain the sealed nature of the shell 52 to the extent any of the switches, valves, and sensors are disposed within the shell 52 and are in communication with the control module 100. In addition, multiple hermetic terminal assemblies 88 may be used to provide sealed electrical communication through the shell 52.

A temperature sensor 84 measures an ambient temperature outside of the compressor 30. First and second current sensors 86 and 87 measure current flowing into the compressor 30. Specifically, the first and second current sensors 86, 87 may each measure a different one of three input alternating currents. For example, the first current sensor 86 may measure a first current ($I_1$) having a first phase and associated with a single-phase line break protector 90. Additionally, for example, the second current sensor 87 may measure a second current ($I_2$) associated with one of the other two phases. An interruption system 92 may be located proximate to or within the electrical enclosure 82.

The interruption system 92 may include a contactor or circuit breaker 94 that is movable between an open state and a "tripped" state to restrict power supplied from the power supply 50 to the compressor 30 (i.e., to the electric motor 58). Specifically, the interruption system 92 may disconnect from the electric motor 58 all three alternating currents supplied by the power supply 50. For example, the contactor or circuit breaker 94 may be an electromagnetic (EM) switch having a coil or other type of spring that automatically opens the EM switch when a supplied power is disconnected. The contactor or circuit breaker 94, however, may also be another suitable type of switch.

The single-phase line break protector 90 is located within the compressor 30 in proximity to the windings 62. The single-phase line break protector 90 is electrically connected between the power supply 50 and the windings 62 of the electric motor 58. Specifically, the single-phase line break protector 90 connects one of the three alternating currents to one of the windings 62. The single-phase line break protector 90 protects the motor 58 by disconnecting the power supply 50 during fault conditions. For example, the fault conditions may include a temperature greater than a predetermined temperature and/or a current greater than a predetermined current. Although not shown in FIG. 2B, in various implementations, a neutral wire may also be connected to the electric motor 58.

Figure 3A:
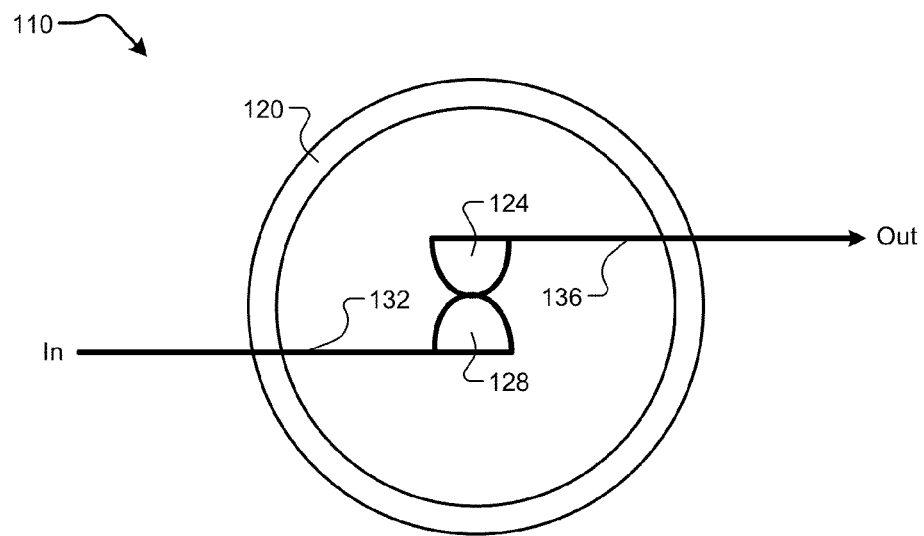
FIGS. 3A and 3B are schematics of a single-phase line break protector and a three-phase line break protector, respectively.

Referring now to FIG. 3A, an example single-phase line break protector 110 is shown. For example, the single-phase line break protector 110 may be used as the single-phase line break protector 90 of FIG. 2B. The single-phase line break protector 110 protects a single current line. Specifically, the single-phase line break protector 110 disconnects the single current line (received at an input, or "IN") from an electric motor (connected to an output, or "OUT"). The single-phase line break protector 110 includes a protector body 120 and first and second elements 124 and 128, respectively. For example, the protector body 120 may include a hermetically-sealed metal enclosure. In various implementations, the protector body 120 may be physically attached to the motor windings 62.

The first element 124 is electrically connected to the single current line IN and the second element 128 is electrically connected to the electric motor OUT. For example, the first and second elements 124, 128 may act as heaters due to current flow. The first and second elements 124, 128 may be attached to thermally-activated contacts 132 and 136, respectively, which bend in the presence of heat. Specifically, the thermally-activated contacts 132, 136 may selectively conduct current from the input IN to the output OUT based on a temperature of the thermally-activated contacts 132, 136. For example, the thermally-activated contacts 132, 136 may be bimetallic contacts.

More specifically, when the magnitude of the current is greater than a predetermined value, the heat generated by the first and second elements 124, 128 due to the current flow may cause the thermally-activated contacts 132, 136 to bend thereby breaking the connection and the flow of current to the motor. For example, the magnitude of the current may be an RMS of the current during a predetermined period. Therefore, the single-phase line break protector 110 may stop the flow of current to the motor due to surges in the supply current. Additionally or alternatively, heat generated by the motor during operation may also cause the thermally-activated contacts 132, 136 to bend and break the connection due to the physical proximity of the single-phase line break protector 110 to the motor. Therefore, the single-phase line break protector 110 may stop the flow of current to the motor due to overheating of the motor.

Figure 3B:
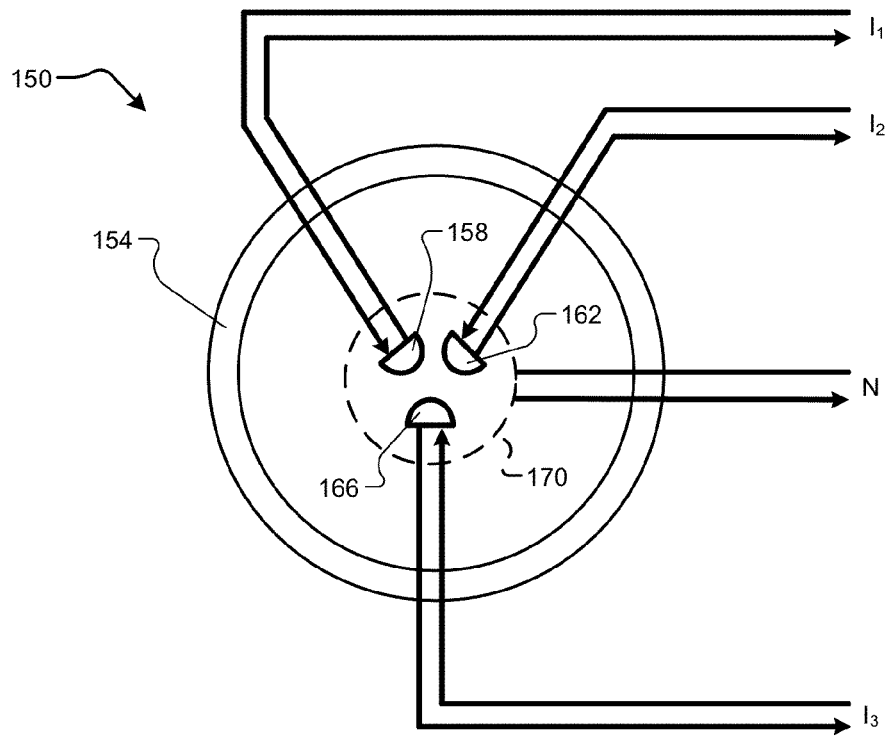

The single-phase line break protector 110 of FIG. 3A may protect a single-phase motor having one winding and one current having one phase. Three-phase motors, on the other hand, receive three alternating currents having three phases, respectively. Therefore, three-phase motors may require a three-phase line break protector to protect the three-phase motor from operating during failure conditions. For example, FIG. 3B illustrates an example three-phase line break protector 150.

The three-phase line break protector 150 includes a protector body 154 and first, second, and third elements 158, 162, and 166, respectively. The first, second, and third elements 158, 162, 166 are electrically connected to the three alternating currents lines $I_1$, $I_2$, and $I_3$, respectively. For example, the first, second, and third elements 158, 162, 166 may act as heaters due to current flow. A thermally-activated metallic disc 170 is located in proximity to the first, second, and third elements 158, 162, 166. For example, the thermally-activated metallic disc 170 may be located below the first, second, and third elements 158, 162, 166 as shown in FIG. 3B.

For example, current flowing through one or more of the first, second, and third elements 158, 162, and 166 may generate heat, which increases the temperature of the thermally-activated metallic disc 170. Additionally or alternatively, heat generated during operation of the motor may increase the temperature of the thermally-activated metallic disc 170. When a temperature of the thermally-activated metallic disc 170 increases to a temperature greater than a predetermined temperature threshold, the thermally-activated metallic disc 170 bends, thereby breaking the connection between all three alternating currents lines $I_1$, $I_2$, $I_3$, and a motor. Alternatively, the thermally-activated metallic disc 170 may interrupt a neutral line (N) in a motor having a star configuration or "Y-configuration."

Implementing three-phase line break protectors, however, may increase costs and/or complexity of the motor protection system. Specifically, the thermally-activated metallic discs may behave differently depending on current magnitudes. For example, an electric motor that generates a greater horsepower may have greater current magnitudes and thus may require a thicker thermally-activated metallic disc and/or thicker first, second, and third elements. Additionally, the predetermined temperature threshold of the thermally-activated metallic disc may vary based on the type and/or amount of thermally-activated metal used. Therefore, three-phase line break protectors require a specific design for each application.

The present disclosure describes systems and methods for protecting three-phase electric motors using a single-phase line break protector. The systems and methods may measure a first current $I_1$ having a first phase. Specifically, the first current $I_1$ may be associated with the single-phase line break protector. The systems and methods may determine a current value based on the first measured current $I_1$. For example, the current value may be a peak value or a root mean squared (RMS) value of the first measured current $I_1$ during a period. The systems and methods may then determine whether the current value is less than or equal to a predetermined threshold. For example, the predetermined threshold may be zero. When the current value is less than or equal to the predetermined threshold, the systems and methods disconnect the motor from a power supply. For example, an interruption system may actuate a contactor or circuit breaker to disconnect the motor from the power supply.

The systems and methods may also measure a second current $I_2$ having a second phase. Specifically, the second current $I_2$ is associated with one of second and third phases of the power supply. The systems and methods may detect a phase loss and/or a reversed phase sequence based on the first and second measured currents $I_1$, $I_2$. Detection of the reversed phase sequence may also indicate an incorrect rotational direction of the motor. When one or more of the phase loss and the reversed phase sequence are detected, the systems and methods may disconnect the power supply from the motor. Disconnecting the power supply from the motor may prevent damage to the motor due to incorrect operation. For example, the incorrect operation may include single-phase operation, two-phase operation, reversed rotational direction of the motor, etc.

Figure 4:
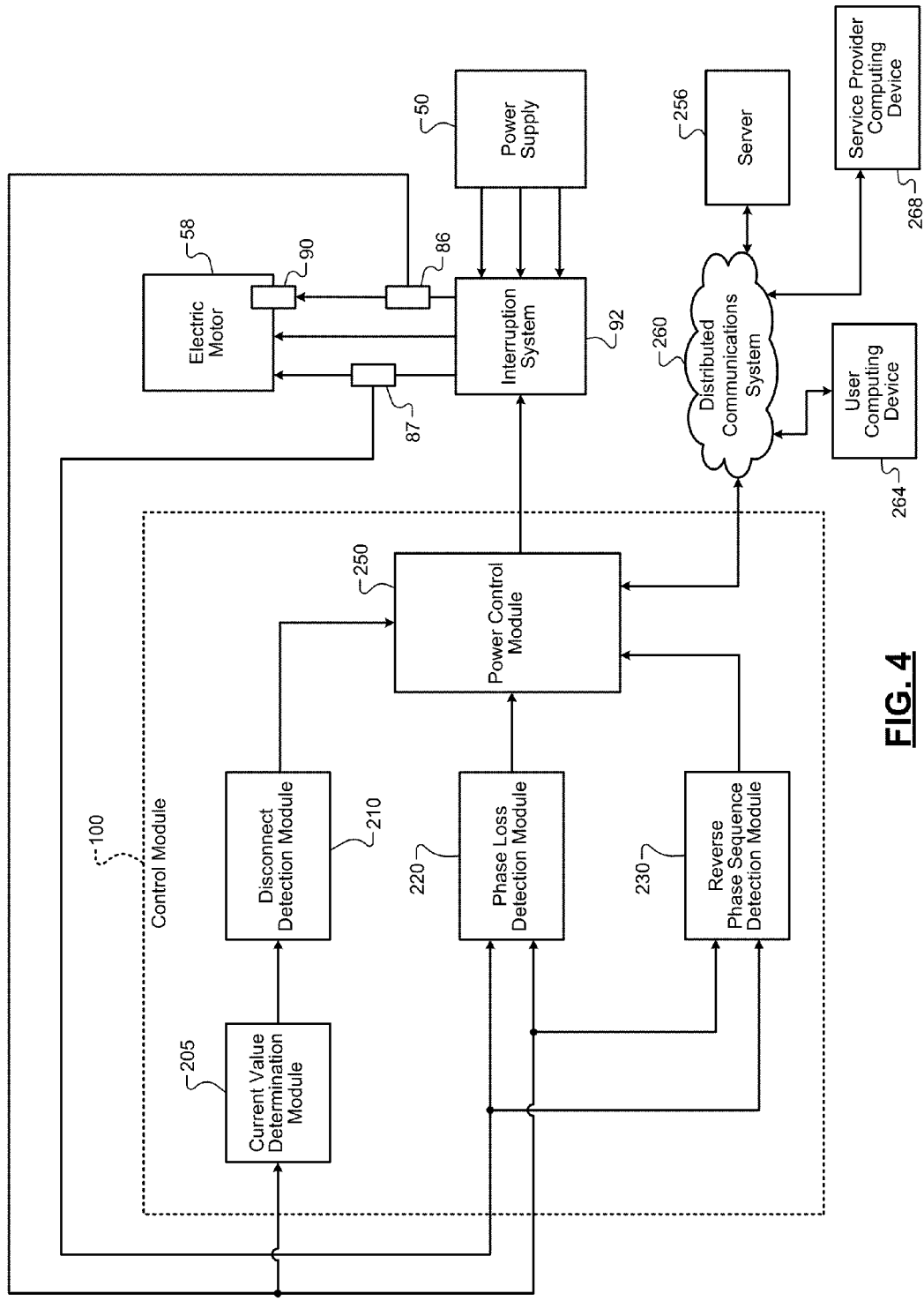
FIG. 4 is a functional block diagram of a control module according to one implementation of the present disclosure.

Referring now to FIG. 4, an example implementation of the control module 100 is shown. The control module 100 includes a current value determination module 205, a disconnect detection module 210, a phase loss detection module 220, a reverse phase sequence detection module 230, and a power control module 250.

The current value determination module 205 receives a signal from the first current sensor 86 indicating a first measured current $I_1$ associated with the single-phase line break protector 90. The current value determination module 205 determines a current value based on the first measured current $I_1$. For example, the current value may be a peak value of the first measured current $I_1$ during a predetermined period or an RMS value of the first measured current $I_1$ during the predetermined period. For example only, the predetermined period may be one period of the first measured current $I_1$.

The disconnect detection module 210 receives the current value from the current value determination module 205. The disconnect detection module 210 determines whether the single-phase line break protector has disconnected the supply line from the electric motor 58. Specifically, the disconnect detection module 210 may determine whether the current value is less than or equal to the predetermined threshold. For example, the predetermined threshold may be zero. When the current value is less than or equal to the predetermined threshold, the disconnect detection module 210 may generate a disconnect signal.

The phase loss detection module 220 receives the first measured current $I_1$. The phase loss detection module 220 also receives a signal from the second current sensor 87 indicating a second measured current $I_2$ associated with one of the other alternating currents. The phase loss detection module 220 detects a loss of one or more of the three alternating currents, also known as a "phase loss." Specifically, the phase loss detection module 220 may determine a period between detection of the first and second measured currents $I_1$, $I_2$. For example, the period between detection of the first and second measured currents $I_1$, $I_2$ may be a period from when the first measured current $I_1$ is greater than a predetermined current threshold until the second measured current $I_2$ is greater than the predetermined current threshold.

When the determined period is greater than a sum of a desired period and a predetermined tolerance, the phase loss detection module 220 may generate a phase loss signal. For example, the desired period may be one-third of a period of the input alternating currents (i.e., corresponding to a 120 degree phase difference). Additionally or alternatively, when the first measured current $I_1$ is not detected for a period greater than a predetermined detection period, the phase loss detection module 220 may generate the phase loss signal. For example, the predetermined detection period may be one period of the input alternating currents.

The reverse phase sequence detection module 230 also receives the first and second measured currents $I_1$, $I_2$. The reverse phase sequence detection module 230 determines whether a sequence of the first and second currents $I_1$, $I_2$ is reversed with respect to a desired sequence. For example, the desired sequence may include a repeating sequence of the three alternating currents $I_1$, $I_2$, and $I_3$. Specifically, the reverse phase sequence detection module 230 may determine whether the first measured current $I_1$ is detected before or after the second measured current $I_2$ during a period. When the first measured current $I_1$ is detected at an incorrect time (respective to the second measured current $I_2$) according to the desired sequence, the reverse phase sequence detection module 230 may generate a reversed phase sequence signal. The reversed phase sequence signal may also indicate an incorrect rotational direction of the electric motor 58.

The power control module 250 may receive the disconnect signal, the phase loss signal, and/or the reversed phase sequence signal. Based on the received signals, the power control module 250 controls the interruption system 92. Specifically, when one or more of the disconnect signal, the phase loss signal, and the reverse phase sequence signal are received, the power control module 250 may actuate the contactor or circuit breaker 94 to disconnect all three phases of the electric motor 58 from the power supply 50. Disconnecting all three phases of the electric motor 58 from the power supply 50 may prevent the electric motor 58 from operating during one or more of the detected failure conditions.

After disconnecting the electric motor 58 from the power supply 50, the power control module 250 may wait for a predetermined shutdown period. The predetermined shutdown period may provide time for the inside of the compressor 30 to cool and thereby close the single-phase line break protector 90. For example only, the predetermined shutdown period may be ten minutes. The power control module 250 may reconnect the electric motor 58 to the power supply 50 and attempt to restart the electric motor 58. However, if the single-phase line break protector 90 remains open, the disconnect detection module 210 can detect the line break and command the power control module 250 to disconnect the electric motor 58 from the power supply 50.

The power control module 250 may record when the electric motor 58 is disconnected from the power supply 50. For example only, the power control module 250 may keep a count of the number of times power is interrupted and may store time stamps for one or more of those occurrences. For example only, the power control module 250 may reset the count to zero if the count has not been incremented for a predetermined period of time. This predetermined period of time may be on the order of seconds or minutes and causes the count to cover recent power interruptions that are fairly closely spaced while ignoring power interruptions that are further removed from the present. Once this count exceeds a threshold, the power control module 250 may stop attempting to restart the electric motor 58. The threshold may be adaptive; for example, the threshold may be reduced in response to the interruption occurrences happening more frequently.

The power control module 250 may report individual interruptions to a server 256 via a distributed communications system 260. For example only, the distributed communications system 260 may include the Internet and/or an additional network, such as an electrical utility grid. The control module 100 may interface with the distributed communications system 260 via a networking device, such as a switch, a router, and/or a gateway.

The server 256 may track interruptions over time and may signal to the power control module 250 when restarting of the electric motor 58 should be halted. In addition, the server 256 may analyze statistical data for preventative maintenance purposes. In addition, the server 256 may register when restarting of the electric motor 58 has been halted and recognize that a service visit may be necessary.

The server 256 may send information to a user computing device 264, which may be a computer, a mobile phone, etc. belonging to an owner of the system that includes the electric motor 58. For example only, the owner may be a residential homeowner or landlord. The user computing device 264 may then communicate with a service provider computing device 268, which may be a computer, cell phone, etc., of a service provider equipped to repair the electric motor 58 and diagnose associated components.

The request to the service provider can be performed at user direction from user computing device 264. Additionally or alternatively, the server 256 may be preconfigured to automatically send fault information to the service provider computing device 268. In various implementations the service provider computing device 268 may be configured to perform remote diagnostics on the electric motor 58 and/or the control module 100. The service provider computing device 268 may therefore instruct the power control module 250 to attempt further restarts of the electric motor 58 in certain circumstances. This may be used to attempt remote restarting of the electric motor 58 once an underlying problem is identified and resolved, such as when an electrical grid has returned to normal operation.

Referring now to FIG. 5, an example method for protecting a three-phase electric motor using a single-phase line break protector begins at 304. At 304, control measures a first current $I_1$ associated with the single-phase line break protector. At 308, control determines a current value based on the first measured current $I_1$. At 312, control determines whether the current value is less than or equal to a predetermined threshold for a predetermined time period. For example only, the predetermined threshold may be zero and the predetermined time period may be 1 second. The predetermined time period may be specified in terms of line cycles, where each line cycle for 60 Hz power is approximately 16.7 milli-seconds.

If the determined current value is less than or equal to the predetermined threshold for at least the predetermined time period, control transfers to 316; otherwise, control transfers to 320. At 320, control measures a second current $I_2$ corresponding to one of the other two alternating current signals. Control continues at 324, where control determines whether phase loss and/or a reversed sequence is present. For example, phase loss and reversed sequence may be determined as described above based on the first and second measured currents $I_1$ and $I_2$. If either phase loss or reversed sequence is detected, control transfers to 316; otherwise control returns to 304.

At 316, control disconnects the electric motor from the power supply and continues at 328. At 328, control optionally records the disconnection and may also record the time of the disconnection. For example only, a count of disconnections may be maintained and, at 328, incremented. A time stamp of the most recent disconnection may be associated with that count, and that time stamp would also be updated at 328. Periodically (not shown in FIG. 5), the count may be reset when the most recent time stamp is more than a predetermined period of time prior to the current time. This prevents past transient errors, unlikely related to current line errors, from influencing the count.

At 328, control may also report the error to an external device, such as a server or data historian. Control continues at 332, where control determines whether a cumulative measure of the disconnections exceeds the threshold. If so, control transfers to 336; otherwise, control transfers to 340. A cumulative measure of disconnections may simply be a count, such as described above with respect to 328. For example only, the threshold of 332 may be set to 5. The threshold may be adaptive—for example, if the disconnections are occurring more frequently, the threshold may be reduced.

At 340, control initializes a shutdown timer to zero and starts the shutdown timer running. Using the shutdown timer provides for a delay prior to restarting of the electric motor to allow the power supply fault to potentially be alleviated. The predetermined shutdown period may have a random component. For example, each time the electric motor is shut down, the predetermined shutdown period may be adjusted within a specified range based on a random or pseudo-random number. In this way, multiple electric motors all using the method of FIG. 5 will not then restart simultaneously.

Control continues at 344, where control determines whether the present time in the shutdown timer is greater than a predetermined shutdown period. If so, control transfers to 348; otherwise, control remains at 344. At 348, control reconnects the electric motor to the power supply and attempts to restart the electric motor. Control then returns to 304.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for protecting a three-phase electric motor of a compressor, the motor receiving first, second, and third phases from a three-phase power supply, the system comprising:
    a single-phase line break protector that disconnects the motor from only the first phase in response to a temperature being greater than a predetermined temperature threshold;
    a first current sensor that measures a first current flowing through the single-phase line break protector; and
    a control module that (i) determines a current value based on the first current independent of current in the second and third phases, and (ii) disconnects the motor from the first, second, and third phases in response to the current value being less than or equal to a predetermined threshold.

2. The system of claim 1 wherein the control module disconnects the motor from the first, second, and third phases by actuating a three-phase interruption device that electrically disconnects the first, second, and third phases from the motor.

3. The system of claim 2 further comprising the three-phase interruption device, wherein the three-phase interruption device includes a contactor.

4. The system of claim 1 wherein the predetermined threshold is zero.

5. The system of claim 1 wherein the current value includes at least one of (i) a peak of the first current during a predetermined period and (ii) a root mean squared (RMS) of the first current during the predetermined period.

6. The system of claim 1 further comprising:
    a second current sensor that measures a second current corresponding to one of the second and third phases,
    wherein the control module selectively detects at least one of a phase loss and a reversed phase sequence based on the first current and the second current, and
    wherein the control module disconnects the motor from the first, second, and third phases in response to one or more of the phase loss and the reversed phase sequence being detected.

7. The system of claim 1 wherein the single-phase line break protector is located proximate to a winding of the motor, and wherein the temperature is responsive to heat generated by the winding during operation of the motor.

8. The system of claim 1 wherein the control module reconnects the motor to the first, second, and third phases in response to a predetermined shutdown period passing subsequent to disconnecting the first, second, and third phases from the motor.

9. The system of claim 1 wherein:
    the single-phase line break protector includes first and second elements that selectively conduct the first current,
    at least one of the first and second elements bends based on the temperature, and
    the temperature is responsive to a magnitude of the first current.

10. The system of claim 1 wherein the control module transmits a report to a remote device via a network in response to occurrences of the control module disconnecting the first, second, and third phases from the motor.

11. A method for protecting a three-phase electric motor of a compressor, the motor receiving first, second, and third phases from a three-phase power supply, the method comprising:

using a line break protector, disconnecting the motor from only the first phase in response to a temperature being greater than a predetermined temperature threshold;

measuring a first current flowing through the line break protector;

determining a current value based on the first current independent of current in the second and third phases; and disconnecting the motor from the first, second, and third phases in response to the current value being less than or equal to a predetermined threshold.

12. The method of claim 11 wherein disconnecting the motor from the first, second, and third phases is performed by actuating a three-phase interruption device that electrically disconnects the first, second, and third phases from the motor.

13. The method of claim 12 wherein the three-phase interruption device includes a contactor.

14. The method of claim 11 wherein the predetermined threshold is zero.

15. The method of claim 11 wherein the current value includes at least one of (i) a peak of the first current during a predetermined period and (ii) a root mean squared (RMS) of the first current during the predetermined period.

16. The method of claim 11 further comprising:

measuring a second current corresponding to one of the second and third phases;

selectively detecting at least one of a phase loss and a reversed phase sequence based on the first current and the second current; and disconnecting the motor from the first, second, and third phases in response to one or more of the phase loss and the reversed phase sequence being detected.

17. The method of claim 11 wherein the temperature is responsive to heat generated by a winding of the motor during operation of the motor.

18. The method of claim 11 further comprising reconnecting the motor to the first, second, and third phases in response to a predetermined shutdown period passing subsequent to disconnecting the first, second, and third phases from the motor.

19. The method of claim 11 wherein the temperature is responsive to a magnitude of the first current.

20. The method of claim 11 further comprising transmitting a report to a remote device via a network in response to performing the disconnecting the first, second, and third phases from the motor.

* * * * *